United States Patent
Kehret et al.

(10) Patent No.: US 7,757,477 B2
(45) Date of Patent: Jul. 20, 2010

(54) CONVERGENT DIVERGENT NOZZLE WITH SLOT COOLED NOZZLE LINER

(75) Inventors: Debora F. Kehret, Manchester, CT (US); Jorge I. Farah, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 575 days.

(21) Appl. No.: 11/676,595

(22) Filed: Feb. 20, 2007

(65) Prior Publication Data
US 2009/0072044 A1    Mar. 19, 2009

(51) Int. Cl.
F02K 99/00 (2009.01)
F02K 1/00 (2006.01)
B05B 1/24 (2006.01)
B63H 11/10 (2006.01)

(52) U.S. Cl. .............. 60/266; 60/232; 239/13; 239/265.19; 239/265.33; 239/265.39; 239/265.41

(58) Field of Classification Search ............ 239/13, 239/265.19, 265.33, 265.39, 265.37, 265.41; 244/53; 74/526; 92/15, 17, 20, 23, 28, 62
See application file for complete search history.

(56) References Cited

U.S. PATENT DOCUMENTS

| | | | |
|---|---|---|---|
| 3,972,475 A | 8/1976 | Nelson et al. | |
| 4,043,509 A | 8/1977 | McHugh et al. | |
| 4,073,441 A | 2/1978 | Nash et al. | |
| 4,144,551 A | 3/1979 | Smith et al. | |
| 4,171,093 A | 10/1979 | Honeycutt, Jr. et al. | |
| 4,203,286 A | 5/1980 | Warburton | |
| 4,643,356 A | 2/1987 | Holler et al. | |
| 4,718,230 A | 1/1988 | Honeycutt, Jr. et al. | |
| 4,747,542 A | 5/1988 | Cires et al. | |
| 4,747,543 A | 5/1988 | Madden | |
| 4,973,272 A | 11/1990 | Chase et al. | |
| 5,000,386 A | 3/1991 | Lybarger | |
| 5,060,472 A | 10/1991 | Schirtzinger | |
| 5,067,324 A | 11/1991 | Beytes et al. | |
| 5,076,496 A | 12/1991 | Lippmeier | |
| 5,080,284 A | 1/1992 | Cires | |
| 5,101,624 A * | 4/1992 | Nash et al. .................... 60/266 |
| 5,111,992 A | 5/1992 | Barcza | |
| 5,131,222 A | 7/1992 | Auxier et al. | |

(Continued)

OTHER PUBLICATIONS

U.S. Appl. No. 11/355,116, filed Feb. 15, 2006, "Convergent Divergent Nozzle With Supported Divergent Seals".

(Continued)

*Primary Examiner*—Dinh Q Nguyen
*Assistant Examiner*—Justin Jonaitis
(74) *Attorney, Agent, or Firm*—Carlson, Gaskey & Olds PC (57) ABSTRACT

A nozzle system includes a multitude of circumferentially distributed convergent flaps and seals that circumscribe an engine centerline. A cooling liner body cooperates with a cooling liner panel attached to respective convergent flaps and convergent seals to define an annular cooling airflow passageway which is movable therewith. Each cooling liner panels includes an arcuate cooling liner leading edge with a multiple of openings to distribute cooling airflow over both the inner "cold-side" and outer "hot-side" surfaces thereof. Through this backside cooling, thermal gradients are controlled at the attachment interface between the arcuate cooling liner leading edge and the main cooling liner body.

19 Claims, 9 Drawing Sheets

U.S. PATENT DOCUMENTS

| | | | |
|---|---|---|---|
| 5,141,154 A * | 8/1992 | Barcza | 239/127.3 |
| 5,188,292 A | 2/1993 | Frey et al. | |
| 5,209,059 A | 5/1993 | Ward | |
| 5,215,256 A | 6/1993 | Barcza | |
| 5,239,815 A | 8/1993 | Barcza | |
| 5,239,823 A | 8/1993 | Sims | |
| 5,249,419 A | 10/1993 | Landhuis | |
| 5,255,849 A | 10/1993 | Mayer et al. | |
| 5,269,467 A | 12/1993 | Williams et al. | |
| 5,364,029 A | 11/1994 | Barcza | |
| 5,437,411 A | 8/1995 | Renggli | |
| 5,484,105 A * | 1/1996 | Ausdenmoore et al. | 239/127.3 |
| 5,508,626 A | 4/1996 | Halin et al. | |
| 5,522,546 A | 6/1996 | Jarvis | |
| 5,524,438 A | 6/1996 | Johnson et al. | |
| 5,560,198 A | 10/1996 | Brewer et al. | |
| 5,586,431 A * | 12/1996 | Thonebe et al. | 60/226.1 |
| 5,683,034 A | 11/1997 | Johnson et al. | |
| 5,775,589 A | 7/1998 | Vdoviak et al. | |
| 5,794,851 A | 8/1998 | Barcza | |
| 5,797,544 A | 8/1998 | Ward | |
| 5,799,874 A | 9/1998 | Eigenbrode et al. | |
| 5,813,609 A * | 9/1998 | Ellerhorst | 239/127.3 |
| 5,813,611 A | 9/1998 | Cires et al. | |
| 5,833,139 A | 11/1998 | Sondee et al. | |
| 5,839,663 A | 11/1998 | Broadway et al. | |
| 5,982,259 A | 11/1999 | Godfrey et al. | |
| 6,091,596 A | 7/2000 | Godfrey et al. | |
| 6,142,416 A | 11/2000 | Markstein et al. | |
| 6,301,877 B1 | 10/2001 | Liang et al. | |
| 6,347,510 B1 | 2/2002 | McAlice et al. | |
| 6,398,129 B1 | 6/2002 | Johnson | |
| 6,512,380 B2 | 1/2003 | Turvey | |
| 6,597,154 B2 | 7/2003 | Foch et al. | |
| 6,607,355 B2 | 8/2003 | Cunha et al. | |
| 6,683,771 B2 | 1/2004 | Foch et al. | |
| 6,814,632 B1 | 11/2004 | Peterson | |
| 6,849,962 B2 | 2/2005 | McCool | |
| 7,032,835 B2 * | 4/2006 | Murphy et al. | 239/128 |
| 7,296,397 B2 * | 11/2007 | Curtelin et al. | 60/232 |
| 7,377,099 B2 * | 5/2008 | Cowan et al. | 60/230 |

OTHER PUBLICATIONS

U.S. Appl. No. 11/540,279, filed Sep. 29, 2006, "Axially Split Nozzle Liner for Convergent Nozzle".

U.S. Appl. No. 11/492,412, filed Jul. 25, 2006, "Low Profile Attachment Hanger System for a Cooling Liner Within a Gas Turbine Engine Swivel Exhaust Duct".

U.S. Appl. No. 11/265,862, filed Nov. 3, 2005, "Metering Sheet and Iso-Grid Arrangement for a Non Axi-Symmetric Shaped Cooling Liner Within a Gas Turbine Engine Exhaust Duct".

U.S. Appl. No. 11/671,591, filed Feb. 6, 2007, "Convergent Divergent Nozzle With Edge Cooled Divergent Seals".

* cited by examiner

CONVERGENT DIVERGENT NOZZLE WITH SLOT COOLED NOZZLE LINER

This invention was made with government support under Contract No. N00019-02-C-3003 with the Department of Navy. The government therefore has certain rights in this invention.

BACKGROUND OF THE INVENTION

The present invention relates to gas turbine engines having convergent/divergent nozzles, and more particularly to a cooled divergent seal arrangement.

An exhaust nozzle optimizes the thrust produced within a gas turbine engine. In augmented gas turbine engines, convergent/divergent (C/D) nozzles provide a multitude of nozzle positions. Flaps circumferentially distributed aft of the augmentor or exhaust duct form the convergent and divergent sections for which the nozzle is named. Flap seals disposed between adjacent flaps minimize gas leakage between flaps in both sections. The convergent section is pivotally connected to the augmentor or exhaust duct and to the divergent section. The divergent section is pivotally connected to the convergent section and to an external fairing positioned radially outboard of the divergent section. The opposite end of the external fairing is pivotally attached to a static outer casing which surrounds a portion of the nozzle. Together, the outer casing, the convergent and divergent sections, and the external fairing form a nozzle plenum.

Because of the high temperature of the core gas exiting the turbine and augmentor, exhaust nozzles are cooled with air bled at a lower temperature and a higher pressure than that of the exhaust gas flow passing through the nozzle system. Cooling air enters the exhaust gas path within the augmentor or exhaust duct via cooling holes in the augmentor or exhaust duct liner and subsequently passes into the nozzle system as a layer of cooling airflow along the inner surface or "hot side" of the nozzle flaps and seals. Cooling airflow within the nozzle plenum also cools the "cold side" side of the flaps and flap seals.

Conventional nozzle systems employ geometry to seal between a cooling liner body and the nozzle system convergent section flaps and flap seals. Traditionally, a columbium alloy (Nb) is utilized as the material of choice for its inherit low Coefficient or Thermal Expansion (CTE). However, Nb may have limited strength and may require difficult to process and maintain coatings. Raw material costs and current lead-time for procurement of Nb is also relatively significant.

Accordingly, it is desirable to provide effective cooling of a cooling liner main body convergent section interface with materials which are less expansive to manufacture yet provide increased durability.

SUMMARY OF THE INVENTION

The nozzle system according to the present invention includes a plurality of circumferentially distributed convergent flaps, divergent flaps, convergent seals and divergent seals which circumscribe an engine centerline and define the radial outer boundary of a core gas path. The flaps and seals define a convergent section and a divergent section of the nozzle system with the jet area defined therebetween. Each convergent seal is pivotally connected to a stationary frame with each divergent seal pivotally connected at a joint at an aft end section of the convergent seal.

A cooling liner main body cooperates with a cooling liner panel attached to each convergent flap and convergent seal to define an annular cooling airflow passageway which is movable therewith. The cooling liner panels guides a cooling airflow along an inner surface of the convergent flaps and convergent seals to at least partially shield the nozzle system from the intense heat of the exhaust gas flow.

Each cooling liner panel includes an arcuate cooling liner leading edge which interfaces with an aft cooling liner seal land wall of the cooling liner main body assembly. The arcuate cooling liner leading edge provides a cam interface which facilitates a seal during nozzle system articulation. The arcuate cooling liner leading edge includes a multiple of openings which are rectilinear slot shaped openings to distribute cooling airflow over both the inner "cold-side" and outer "hot-side" surfaces of the cooling liner panel. Through this backside cooling of the cooling liner panels thermal gradients are controlled at the attachment interface between the arcuate cooling liner leading edge and the main cooling liner body. The provision of a smooth film cooling boundary layer of the cooling airflow minimizes thermal cycling and mitigates the necessity of exotic alloys in this area of the convergent section.

The present invention therefore provides effective cooling of a cooling liner main body convergent section interface with materials which are less expansive to manufacture yet provide increased durability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
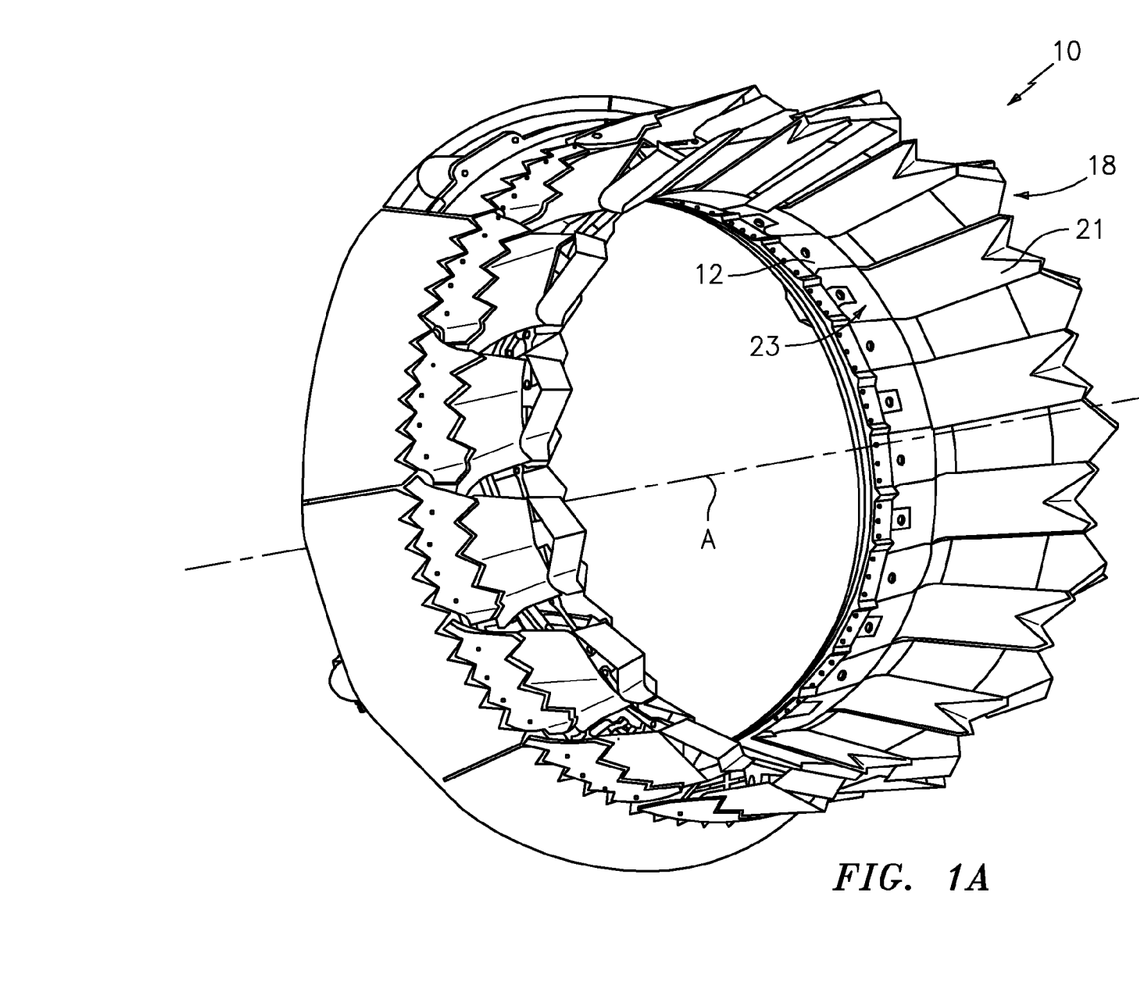
FIG. 1A is a general perspective view of a variable geometry exhaust nozzle of the present invention with the nozzle shown in a maximum position.
Figure 1B:
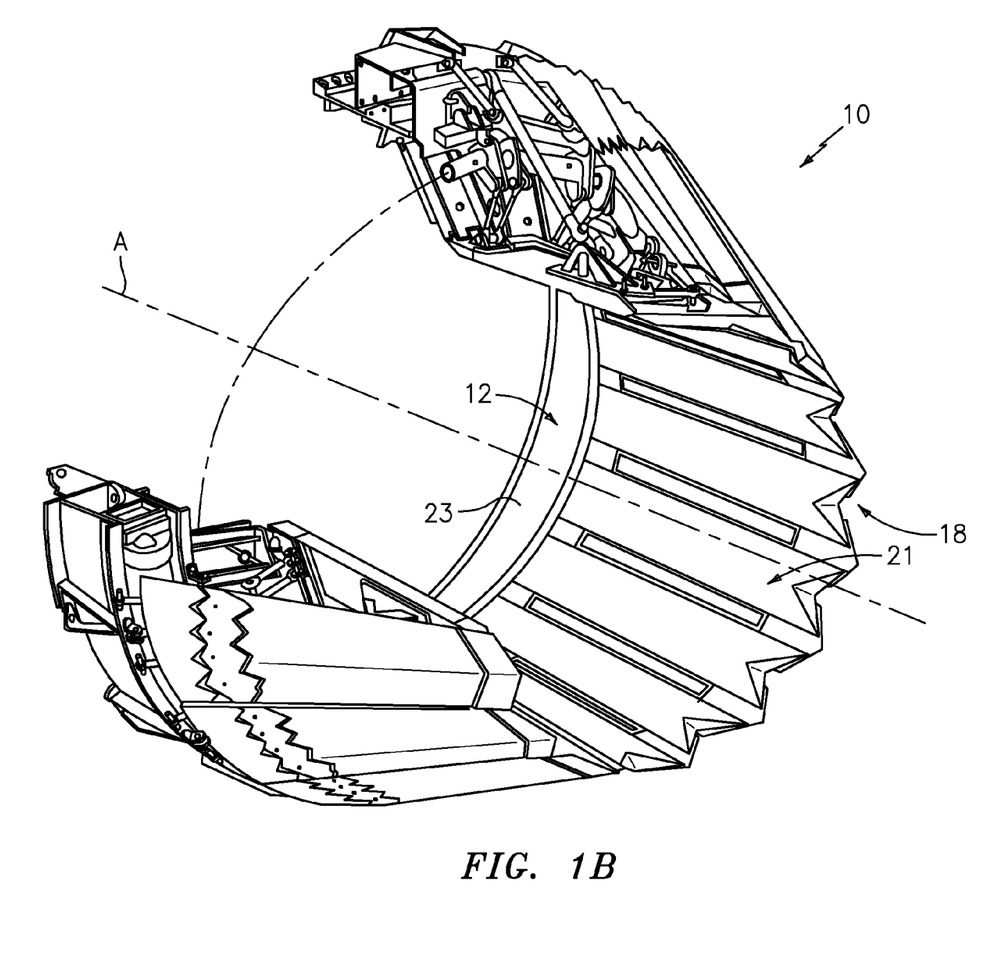
FIG. 1B is a general perspective view of a variable geometry exhaust nozzle of the present invention with the nozzle shown in a minimum position.

FIGS. 1A and 1B illustrate an axi-symetric high degree of motion (HDM) nozzle system 10 for a gas turbine engine. FIG. 1A depicts the nozzle 10 in a maximum dilated position relative a nozzle centerline A (also illustrated in cross-section FIG. 2A), which is typical during afterburning operation, and FIG. 1B depicts the nozzle system 10 in a minimal dilated position relative the nozzle centerline A (FIG. 2B), which is typical during non-afterburning operation.

Figure 2A:
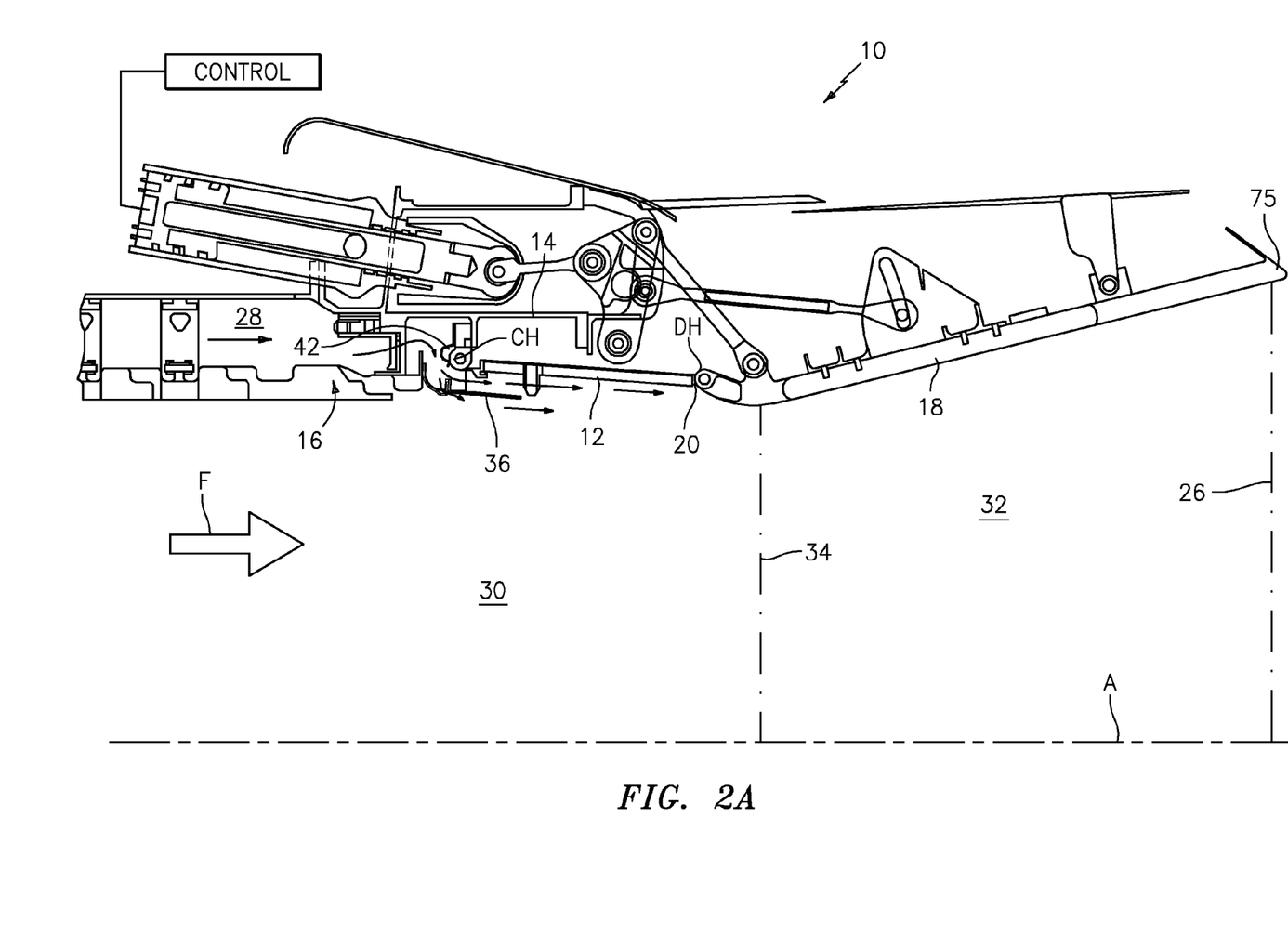
FIG. 2A is a general sectional side view of a variable geometry exhaust nozzle of the present invention with the nozzle shown in a maximum position which corresponds with FIG. 1A, the nozzle being illustrated on only one side of its centerline.
Figure 2B:
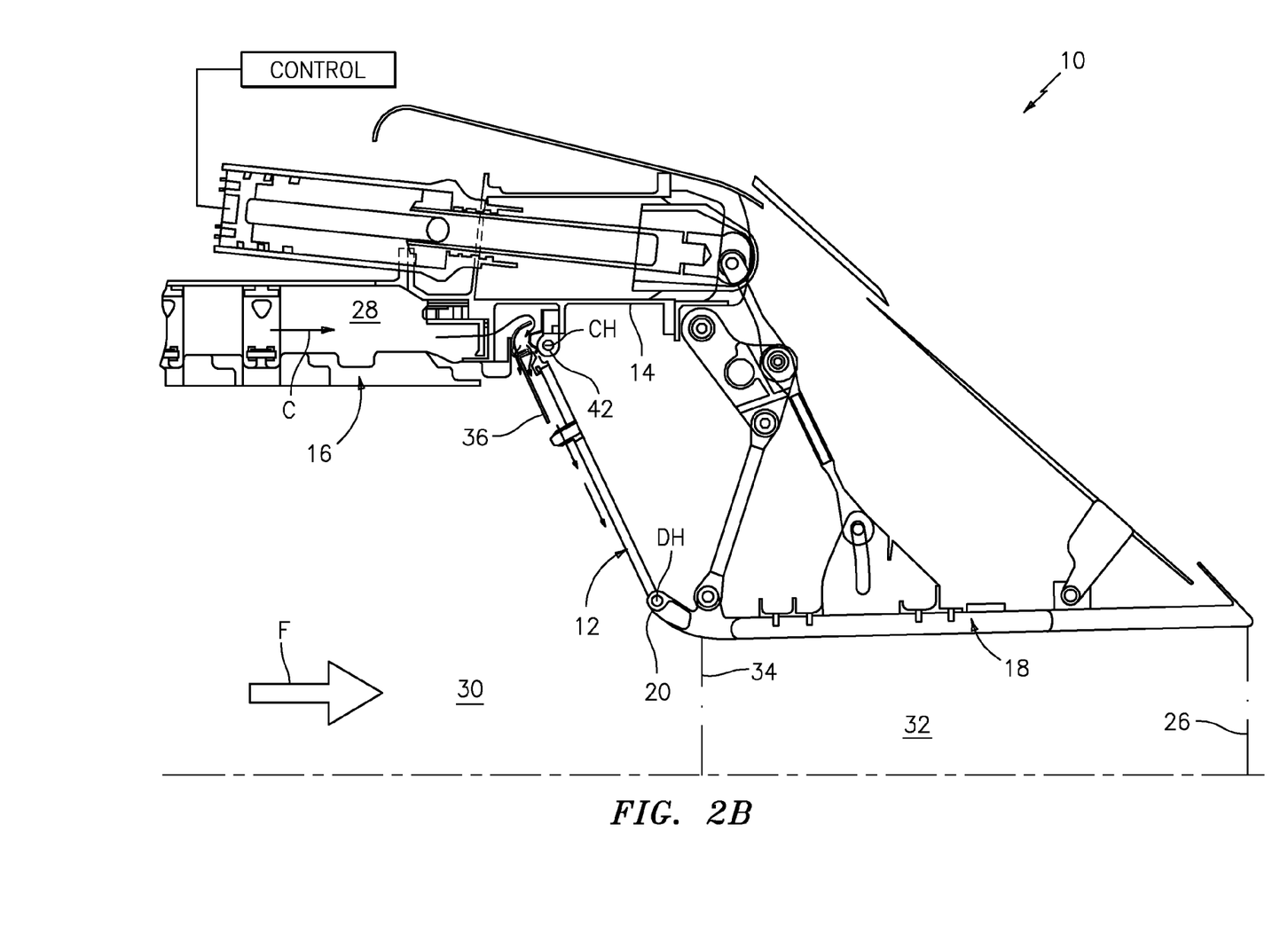
FIG. 2B is a general sectional side view of a variable geometry exhaust nozzle of the present invention with the nozzle shown in a minimum position which corresponds with FIG. 1B, the nozzle being illustrated on only one side of its centerline.

Referring to FIGS. 2A and 2B, the nozzle includes a plurality of circumferentially distributed convergent flaps 12 (only one shown in section), each pivotably connected to a stationary structure 14 at a convergent section hinge line $C_h$ having a cooling liner body 16 upstream thereof. A plurality of circumferentially distributed divergent flaps 18 (only one shown in section) are pivotably connected at a convergent joint structure 20 to an aft end section of the convergent flaps 12.

Figure 3:
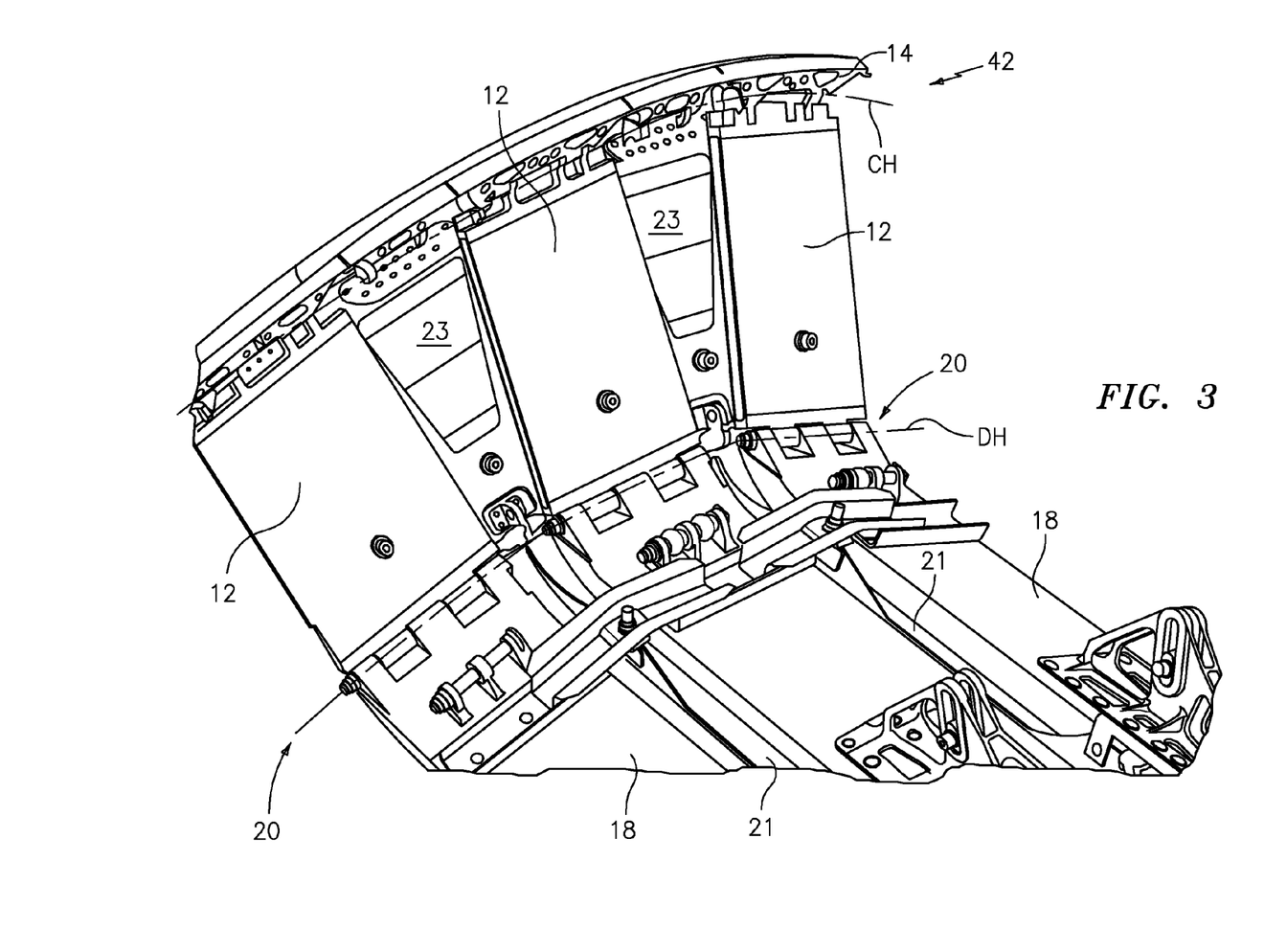
FIG. 3 is a general perspective internal view of a convergent-divergent section of the variable geometry exhaust nozzle.

A plurality of divergent seals 21 (FIG. 3) are each pivotably connected to a respective convergent seal 23 which are respectively distributed circumferentially between each of the divergent flap 18 and convergent flap 12 pairs. Each convergent seal 23 is pivotably connected to the stationary structure 14 with each divergent seal 21 pivotably connected at a divergent joint structure 42 adjacent an aft end section of each convergent seal 23.

Taken collectively, the convergent flaps 12, the divergent flaps 18 and the convergent and divergent seals 21, 23 circumscribe the nozzle centerline A to define the radial outer boundary of a combustion gas path F (FIGS. 2A, 2B). During operation, a control system (illustrated schematically) governs the angular orientations of the convergent flaps 12 and divergent flaps 18 to adjust the nozzle throat area 34 and exit area 26.

The flaps 12, 18 and seals 21, 23 define a convergent section 30 and a divergent section 32 of the nozzle system 10 with the throat area 34 defined therebetween. The throat area 34 is the minimum cross sectional area of the nozzle which when compared to the nozzle exit area 26 defines a nozzle area ratio.

The cooling liner body 16 cooperates with a cooling liner panel 36, 38 (FIGS. 4A, 4B, and 4C) attached to each respective convergent flap 12 and convergent seal 23 to define an annular cooling airflow passageway 28 which is movable therewith. The passageway 28 guides a cooling airflow (illustrated schematically by arrows C) along an inner surface of the convergent flaps 12 and convergent seals 23. The cooling airflow C is typically sourced from fan bypass airflow and/or other airflow that is different from the exhaust gas flow (illustrated schematically by arrow F). The cooling airflow C at least partially shields the flaps 12, 18 and seals 21, 23 from the intense heat of the exhaust gas flow F which is generally communicated along the nozzle centerline A.

Figure 4A:
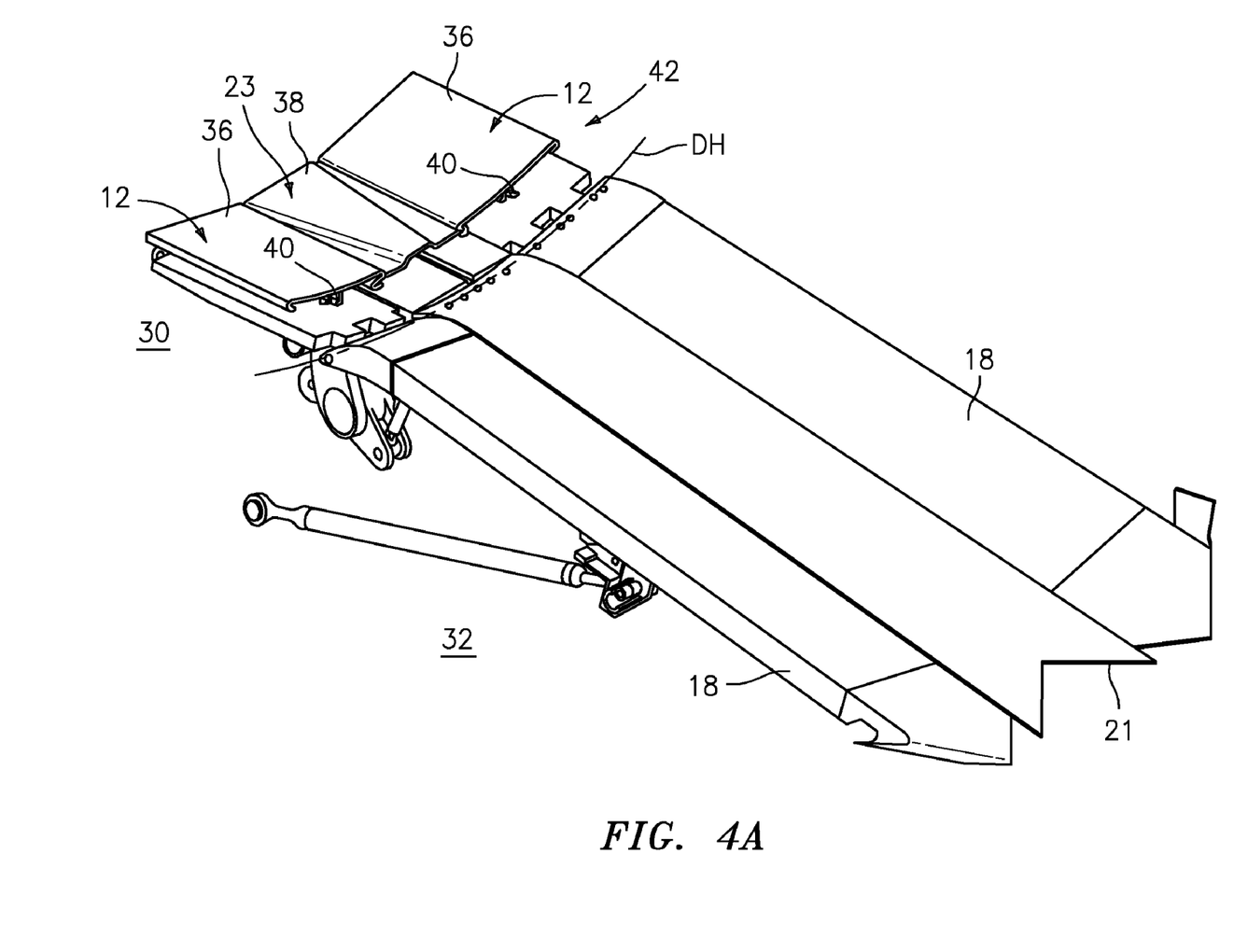
FIG. 4A is a general perspective view of a convergent-divergent section illustrating two flaps and one seal from a "hot" side.

Referring to FIG. 4A, the cooling liner panels 36, 38 are each attached to a respective convergent flap 12 and convergent seal 23 through a bracket assembly 40. Each cooling liner panel 36, 38 at least partially overlaps an adjacent cooling liner panel 38, 36. Within the interior of the nozzle system 10, the cooling liner panels 36, 38 form an inner layer which articulates with the respective convergent flap 12 and convergent seal 23 to direct the cooling airflow C over the respective convergent flap 12 and convergent seal 23 as the throat area 34 changes during nozzle dilation.

Figure 4B:
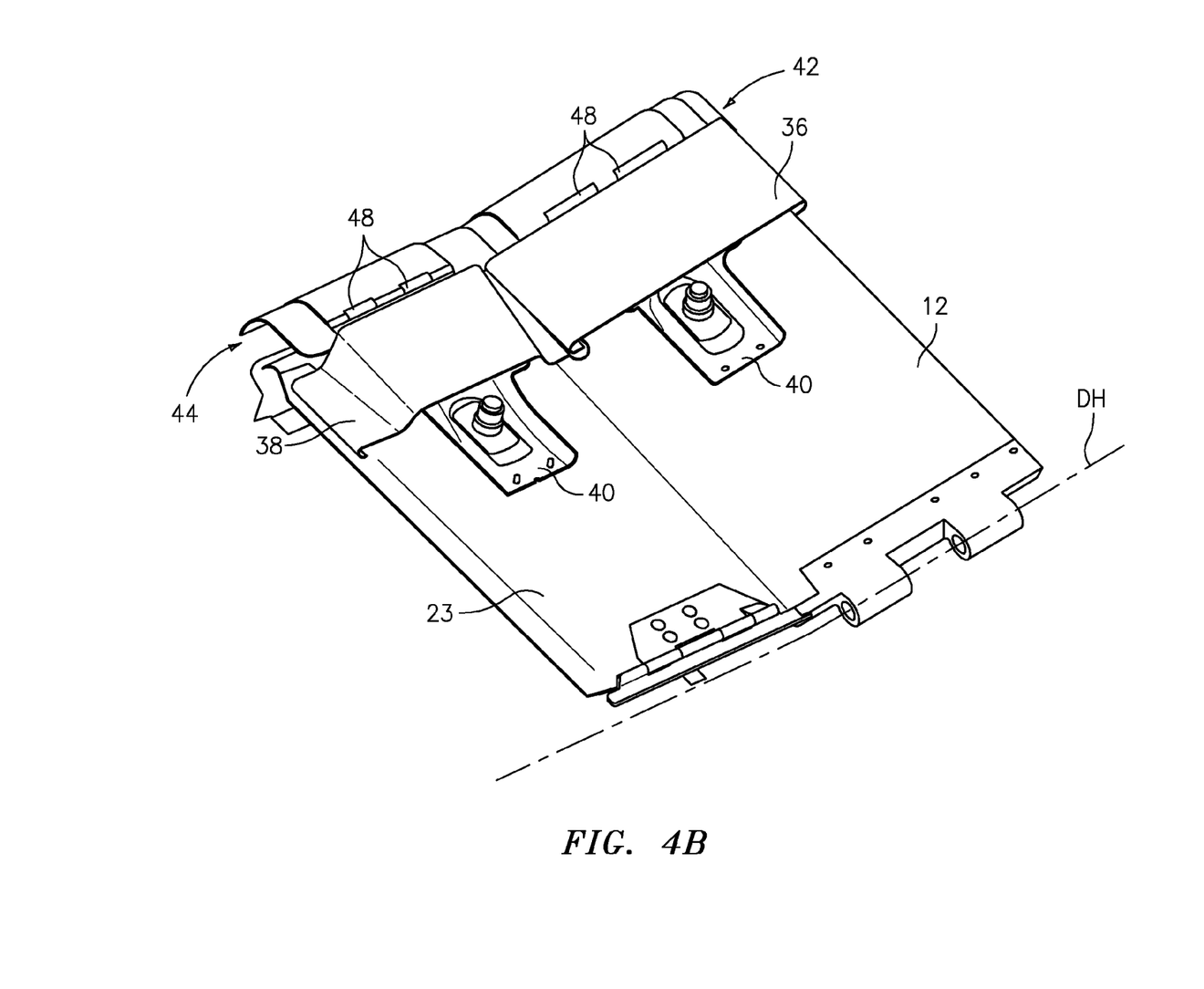
FIG. 4B is a general perspective view of a convergent section from a "hot" side illustrating one flap and one seal at a joint to which the divergent sections attach.
Figure 4C:
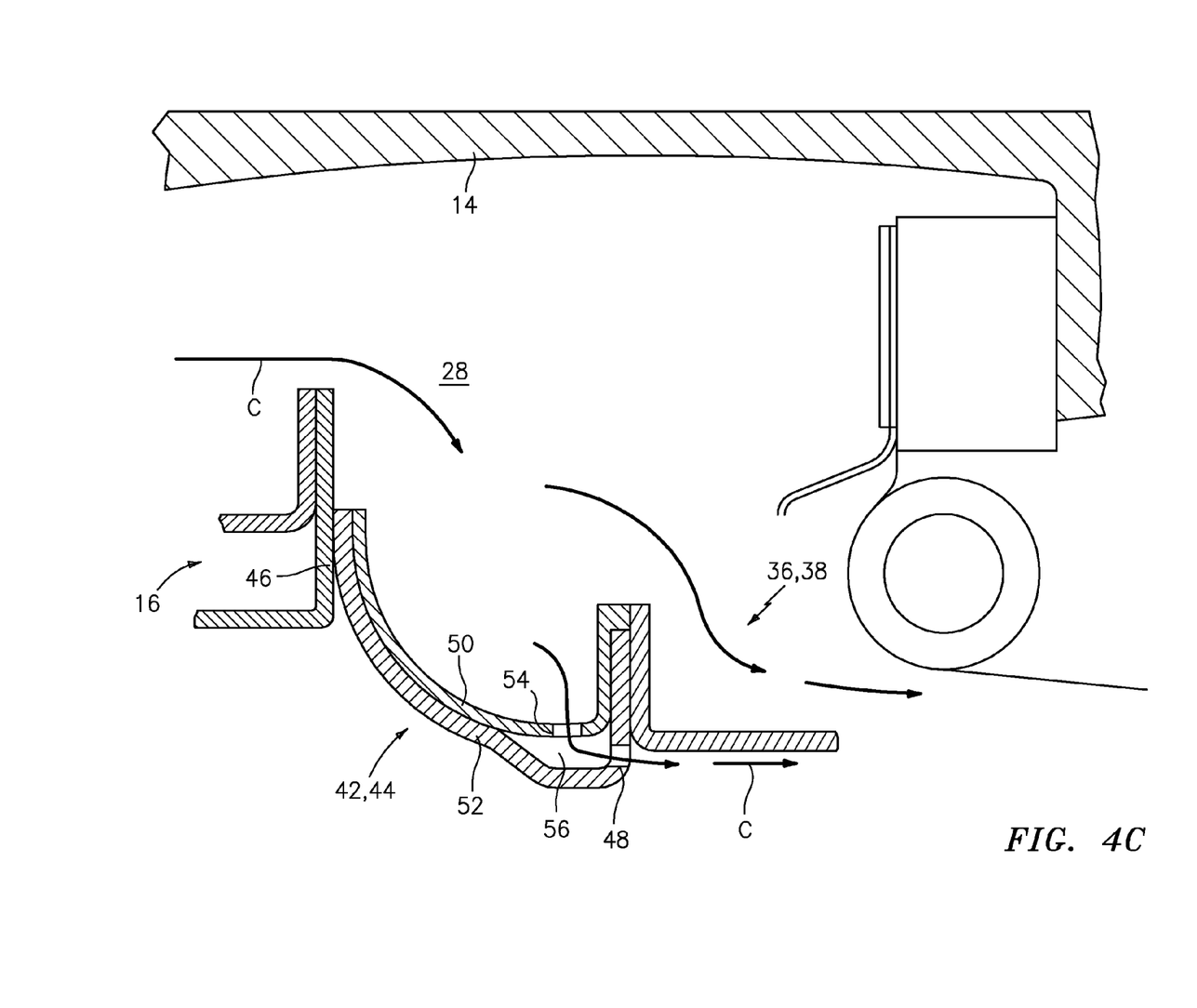
FIG. 4C is a section view of the convergent section cooling liner body cam interface illustrating the backside cooling arrangement of a cooling liner panel.
Figure 5A:
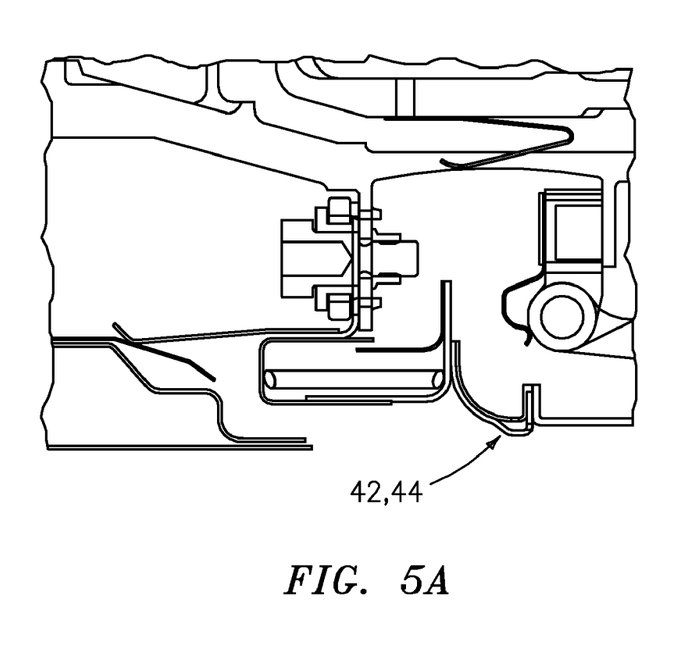
FIG. 5A is an expanded view of the cam interface at a maximum position.
Figure 5B:
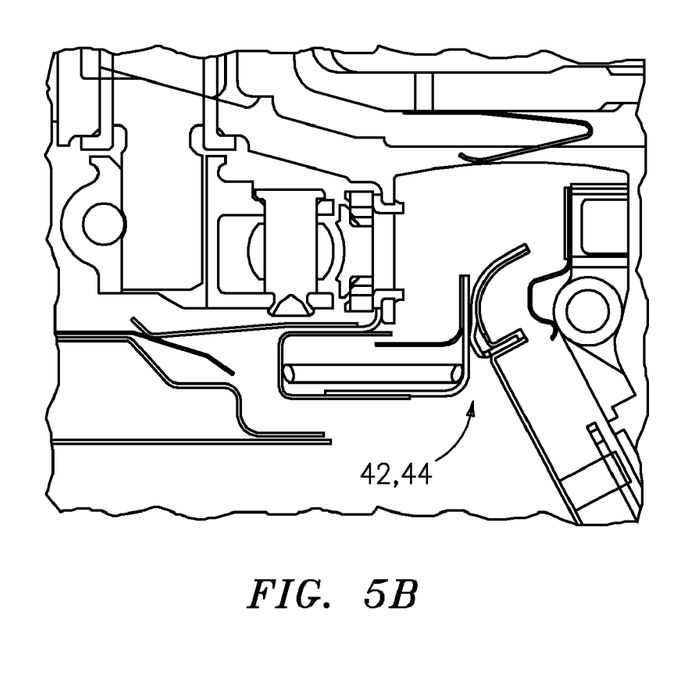
FIG. 5B is an expanded view of the cam interface at a minimum position.

Referring to FIG. 4B, each cooling liner panels 36, 38 includes an arcuate cooling liner leading edge 42, 44 which interfaces with an aft cooling liner seal land wall 46 of the main cooling liner body 16 (FIG. 4C). The arcuate cooling liner leading edge 42, 44 provides a cam interface which facilitates a seal against the seal land wall 46. The arcuate cooling liner leading edge 42, 44 maintains contact and thus seals the cooling air flow C irrespective of articulation of the nozzle system 10 between the maximum position (FIG. 5A) and the minimum position (FIG. 5B).

Movement of the nozzle system between the maximum and minimum position results in portions of the arcuate cooling liner leading edge 42, 44 to cycle between being fully exposed to exhaust gasses being "tucked-in" or shielded from the exhaust gases. The cycling results in significant thermal gradients. This may cause stresses and other challenges. This has been addressed by forming conventional liner panels from materials such as a columbium alloy, which has low coefficients of thermal expansion (CTE) but may have limited strength and may require difficult to process and maintain coatings. However, it is desirable to have more freedom in the material selected for the liner panels 36, 38 such that nickel alloy materials, which have a relatively higher CTE, but is less expensive to manufacture and has increased durability may be utilized to thereby reduce expense and production lead times.

The arcuate cooling liner leading edge 42, 44 includes a multiple of cooling liner openings 48 which are preferably rectilinear slot shaped openings to distribute cooling airflow C over both the inner "cold-side" and outer "hot-side" surfaces thereof. The "hot-side" of the cooling liner panels 36, 38 is directly exposed to the exhaust gases flow path F which exits the engine. The "cold-side" of the cooling liner panels 36, 38 is defined as the side opposite the exhaust gas flow path F Referring to FIG. 4C, each arcuate cooling liner leading edge 42, 44 preferably includes an inner liner sheet 50 and an outer liner sheet 52. The inner liner sheet 50 includes inner liner openings 54 which communicate cooling airflow C into a cooling liner plenum 56 defined between the inner liner sheet 50 and the outer liner sheet 52. The cooling liner plenum 56 is preferably formed as a space between the inner liner sheet 50 and the outer liner sheet 52. The cooling liner panels 36, 38 preferably defines the inner liner sheet 50 of the arcuate cooling liner leading edge 42, 44 with the outer liner sheet 52 being a separate arcuate sheet affixed thereto. That is, the outer liner sheet 52 fits into the inner liner sheet 50 to at least partially overlap the cooling liner panels 36, 38 and define the cooling liner plenum 56 therebetween. It should be understood, however, that various constructions will also be usable with the present invention.

The cooling liner openings 48 are located through the outer liner sheet 52 and are directed generally parallel to the cooling liner panels 36, 38 to direct a smooth film cooling boundary layer of the cooling airflow C. That is, the inner liner openings 54 are generally transverse to the cooling liner panels 36, 38 while the cooling liner openings 48 are generally directed along the cooling liner panels 36, 38. The cooling liner plenum 56 facilitates this redirection.

Through backside cooling of the cooling liner panels 36, 38, the thermal gradients are controlled at the cammed interface defined between the arcuate cooling liner leading edge 42, 44 and the cooling liner seal land wall 46 of main cooling liner body 16 thereby permitting use of more conventional alloy materials. The provision of a smooth film cooling boundary layer of the cooling airflow C thereby minimizes thermal cycling and resolves/mitigates the necessity of exotic alloys in this area of the convergent section 30.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A convergent section of a convergent/divergent nozzle system comprising:
   a cooling liner panel having an arcuate cooling liner leading edge, said arcuate cooling liner leading edge defining a cooling liner opening to direct a cooling airflow along a hot-side of said cooling liner panel, said hot-side exposed to an exhaust gas flow path, said arcuate cooling liner leading edge includes an inner liner sheet and an outer liner sheet, said inner liner sheet includes an inner liner opening which communicates said cooling airflow into a cooling liner plenum defined between said inner liner sheet and said outer liner sheet.

2. The convergent section as recited in claim 1, further comprising a convergent flap mounted to said cooling liner panel through a bracket assembly which spaces said cooling liner panel from said convergent flap.

3. The convergent section as recited in claim 1, further comprising a convergent seal mounted to said cooling liner panel through a bracket assembly which spaces said cooling liner panel from said convergent flap.

4. The convergent section as recited in claim 1, wherein said arcuate cooling liner leading edge interfaces with a cooling liner seal land wall of a main cooling liner body.

5. The convergent section as recited in claim 1, wherein said arcuate cooling liner leading edge engages a cooling liner seal land wall of a main cooling liner body at a cam interface.

6. The convergent section as recited in claim 1, wherein said cooling liner plenum defines said multiple of cooling liner openings which communicate with said hot-side.

7. The convergent section as recited in claim 1, wherein said cooling liner opening is rectilinear.

8. A gas turbine engine having a convergent/divergent nozzle system comprising:
   a main cooling liner body which directs a cooling airflow;
   a multiple of convergent flaps and convergent seals which define a convergent section; and
   a cooling liner panel mounted to each of said multiple of convergent flaps and convergent seals, each of said cooling liner panels having an arcuate cooling liner leading edge which interfaces with an aft cooling liner seal land wall of said main cooling liner body, said arcuate cooling liner leading edge defining a cooling liner opening to direct said cooling airflow along a hot-side of said cooling liner panel, said hot-side exposed to an exhaust gas flow path, said inner liner sheet includes an inner liner opening which communicates said cooling airflow into a cooling liner plenum defined between said inner cooling liner sheet and said outer cooling liner sheet, said cooling liner plenum defines said multiple of cooling liner openings.

9. The engine as recited in claim 8, wherein said arcuate cooling liner leading edge includes an inner cooling liner sheet and an outer cooling liner sheet.

10. The engine as recited in claim 8, wherein said cooling liner plenum redirects a portion of said cooling airflow along said hot-side.

11. A method of communicating a cooling airflow within a convergent section of a gas turbine engine comprising:
   communicating a cooling airflow along a main cooling liner body surrounding the centerline of a gas turbine engine; and
   communicating the cooling airflow from the main cooling liner body airflow along a hot-side of a cooling liner panel attached to each of a multiple of convergent flaps and convergent seals which define the convergent section surrounding the centerline of the gas turbine engine, the hot-side exposed to an exhaust gas flow path communicated generally along a nozzle centerline, the cooling liner panel having an arcuate cooling liner leading edge, the arcuate cooling liner leading edge includes an inner liner sheet and an outer liner sheet, said inner liner sheet includes an inner liner opening which communicates said cooling airflow into a cooling liner plenum defined between said inner liner sheet and said outer liner sheet.

12. The method as set forth in claim 11, further comprising:
   communicating the cooling airflow between each cooling liner panel and one of the respective multiple of convergent flaps and convergent seals from an arcuate cooling liner leading edge.

13. The method as set forth in claim 11, further comprising:
   mounting each cooling liner to cam interface relative an aft cooling liner seal land wall of the main cooling liner body, a cooling line opening located adjacent the cam interface.

14. The convergent section as recited in claim 1, wherein said arcuate cooling liner leading edge interfaces with a cooling liner seal land wall of a cylindrical main cooling liner body.

15. The engine as recited in claim 8, wherein a cold-side of said cooling liner panel is respectively defined between each of said multiple of convergent flaps and said cooling liner panels and respectively between each of said multiple of convergent seals and said cooling liner panels.

16. The engine as recited in claim 8, wherein each of said multiple of cooling liner panels are respectively attached to said convergent flap and said convergent seal such that each of said multiple of cooling liner panels at least partially overlaps an adjacent cooling liner panel.

17. The engine as recited in claim 16, wherein each of said multiple of cooling liner panels are respectively attached to said convergent flap and said convergent seal through a bracket assembly which spaces each of said multiple of cooling liner panels from said convergent flap and said convergent seal.

18. The engine as recited in claim 16, wherein said multiple of cooling liner panels form an inner layer which articulates with said respective multiple of convergent flaps and convergent seals to direct said cooling airflow over said respective convergent flaps and convergent seals as a throat area changes during nozzle system dilation.

19. The convergent section as recited in claim 1, wherein said exhaust gas flow path is directed generally along a nozzle centerline.

* * * * *